US011562310B2

United States Patent
O'Herlihy et al.

(10) Patent No.: US 11,562,310 B2
(45) Date of Patent: *Jan. 24, 2023

(54) SYSTEM AND METHOD FOR PROCESS SHAPING

(71) Applicant: Everseen Limited, Blackpool (IE)

(72) Inventors: Alan O'Herlihy, Glenville (IE); Bogdan Ciubotaru, Donoughmore (IE); Ovidiu Parvu, Timis (RO); Dan Alexandru Pescaru, Timisoara (RO); Vasile Gui, Timisoara (RO)

(73) Assignee: Everseen Limited, Blackpool (IE)

( * ) Notice: Subject to any disclaimer, the term of this patent is extended or adjusted under 35 U.S.C. 154(b) by 81 days.

This patent is subject to a terminal disclaimer.

(21) Appl. No.: 17/376,953

(22) Filed: Jul. 15, 2021

(65) Prior Publication Data
US 2021/0342756 A1 Nov. 4, 2021

Related U.S. Application Data

(63) Continuation of application No. 16/689,348, filed on Nov. 20, 2019, now Pat. No. 11,093,881.

(Continued)

(51) Int. Cl.
*G06Q 10/06* (2012.01)
*G06F 40/211* (2020.01)
*G06F 16/783* (2019.01)

(52) U.S. Cl.
CPC ....... *G06Q 10/0633* (2013.01); *G06F 16/784* (2019.01); *G06Q 10/067* (2013.01)

(58) Field of Classification Search
CPC . G06Q 10/0633; G06F 40/211; G06F 40/295; G06N 5/02; G06N 20/00
See application file for complete search history.

(56) References Cited

U.S. PATENT DOCUMENTS 10,382,300 B2 8/2019 Ellenbogen et al.
2008/0283611 A1* 11/2008 Knowles ............ G06K 7/10693
235/462.42

(Continued)

FOREIGN PATENT DOCUMENTS

JP 5866559 B2 2/2016
WO 2017062635 A1 4/2017

OTHER PUBLICATIONS

Parashar, Neeraj; Gamifying Enterprise BPM—An approach using AI platforms, Economic Times, Mar. 17, 2017. (https://tech.economictimes.indiatimes.com/news/technology/gamifying-enterprise-bpm-an-approach-using-ai-platforms/57684045).

(Continued)

*Primary Examiner* — Chris Parry
*Assistant Examiner* — Hassan A Khan
(74) *Attorney, Agent, or Firm* — Young Basile Hanlon & MacFarlane, P.C.

(57) ABSTRACT

A system for process shaping in a retail store environment comprises a video generation and processing component, a data source integration and aggregation component for aggregating and integrate information received from various sources, a process sensing component for generating one or more continuous processes, a process aggregator and weighing component for aggregating the one or more continuous processes into a merged weighted process, a proof of problem and value component for determining one or more process variations, a ripple effect analyser for sending one or more nudging messages to the retail store environment, and a gamified feedback algorithm component for communicating a nudging action corresponding to a nudging message, to one or more entities in the retail store environment.

18 Claims, 5 Drawing Sheets

Related U.S. Application Data

(60) Provisional application No. 62/771,209, filed on Nov. 26, 2018.

(56) References Cited

U.S. PATENT DOCUMENTS

| | | | | |
|---|---|---|---|---|
| 2010/0001924 | A1* | 1/2010 | Nobutsugu | G09F 9/302 345/1.1 |
| 2011/0085700 | A1* | 4/2011 | Lee | G06V 20/52 382/103 |
| 2015/0208043 | A1* | 7/2015 | Lee | G06V 40/174 348/150 |
| 2017/0032304 | A1* | 2/2017 | Charpentier | G06Q 10/06316 |
| 2017/0099200 | A1* | 4/2017 | Ellenbogen | G06N 5/022 |
| 2017/0228810 | A1* | 8/2017 | Shang | G06Q 10/067 |
| 2020/0410413 | A1* | 12/2020 | Moki | G06Q 10/0633 |

OTHER PUBLICATIONS

International search report issued in corresponding international application No. PCT/IB2019/059993 dated Feb. 7, 2020.

* cited by examiner

SYSTEM AND METHOD FOR PROCESS SHAPING

CROSS-REFERENCE TO RELATED APPLICATION(S)

This application is a continuation of U.S. application Ser. No. 16/689,348, filed Nov. 20, 2019, which claims priority to and the benefit of U.S. Provisional Application Ser. No. 62/771,209, filed Nov. 26, 2018, the entire disclosure of which is hereby incorporated by reference.

TECHNICAL FIELD

The present disclosure relates generally to sensing an environment for actions and activities, and more specifically to using image and activity recognition for shaping of processes pertaining to the environment.

BACKGROUND

Companies in all business sectors use various forms of business process management to manage and improve corporate performance. Process management methodologies include process management focused on process discovery, process comparison with expected process (meta process) and process shaping by feedback loop/interaction with the environment. The "AS-IS" process defines the current state of the business process in a particular organization. Typically, the analysis goal in putting together the current state process of a business, is to clarify exactly how the business process works today. However, today's "AS-IS" process formulation is simply a "best guess" and a "snapshot in time". The main challenge is the lack of up to date information which makes the existing process management systems blind to the reality of daily business activites. In some enterprise environments, the management teams face the problem of designing, organising, and supervising existing ad-hoc processes mainly due to unpredictable human behaviour.

Indeed, it is difficult to recognize various human actions, and to perform global tracking of the entities and activities that play various roles in the considered environment. Examples of entities include, but are not limited to, employees, products, conveyors, industrial robots. Example of activities include, but are not limited to, operator entering or exiting the scene; picking, dropping, moving, weighting or scanning items; operating a touchscreen display; and paying through a credit card.

In view of the above, there is a need for a system that facilitates designing and shaping processes based on recognition of various human actions and global tracking of various entities.

SUMMARY

According to an aspect of the present disclosure, there is provided a system for process shaping in a retail store environment. The system includes a video generation and processing component configured to capture image and video data of the retail store environment in real-time, for recognizing one or more actions of one or more entities, and performing global tracking of the one or more entities. The system may further include a data source integration and aggregation component configured to aggregate and integrate information received from the video generation and processing component and Internet of Things (IoT) devices, Point of Sale (PoS) systems, and Enterprise Resource Planning (ERP) systems of the retail store environment, for extracting and interpreting one or more user activities spanning over a predefined interval. The system may further include a process sensing component configured to generate one or more continuous processes based on aggregated and integrated information, each continuous process representing a sequence of user activities in a predefined location within the retail store environment. The system may further include a process aggregator and weighing component configured to aggregate one or more continuous processes into a merged weighted process, to perform process model extraction, virtualized process modelling and anomalies detection. The system may further include a proof of problem and value component configured to compare the merged weighted process with a predfined reference process for determining one or more process variations. The system may further include a ripple effect analyser configured to monitor a current version of the merged weighted process and a previous version of the merged weighted process to detect naturally occurring one or more ripple effects, and send one or more nudging messages based on the one or more ripple effects, to the retail store environment. The system may further include a gamified feedback algorithm component configured to transmit a nudging message that communicates a nudging action, to one or more entities in the retail store environment, and transmit a reward if the nudging action has been successfully performed by the one or more entities.

According to another aspect of the present disclosure, there is provided a method for process shaping in a retail store environment. The method includes capturing image and video data of the retail store environment in real-time, for recognizing one or more actions of one or more entities, and performing global tracking of the one or more entities. The method may further include aggregating and integrating image and video data with information provided by Internet of Things (IoT) devices, PoS systems, and Enterprise Resource Planning (ERP) systems of the retail store environment, for extracting and interpreting one or more user activities spanning over a predefined interval. The method may further include generating one or more continuous processes based on aggregated and integrated information, each continuous process representing a sequence of user activities in a predefined location within the retail store environment. The method may further include aggregating one or more continuous processes into a merged weighted process, to perform process model extraction, virtualized process modelling and anomalies detection. The method may further include comparing the merged weighted process with a predfined reference process for determining one or more process variations. The method may further include monitoring a current version of the merged weighted process and a previous version of the merged weighted process to detect naturally occurring one or more ripple effects, and sending one or more nudging messages based on the one or more ripple effects, to the retail store environment. The method may further include transmitting a nudging message that communicates a nudging action, to one or more entities in the retail store environment, and transmitting a reward if the nudging action has been successfully performed by the one or more entities.

According to yet another aspect of the present disclosure, there is provided a computer programmable product for process shaping in a retail store environment. The computer programmable product comprises a set of instructions, such that the set of instructions when executed by a processor causes the processor to capture image and video data of the retail store environment in real-time, for recognizing one or more actions of one or more entities, and performing global tracking of the one or more entities, and aggregate and integrate image and video data with information provided by Internet of Things (IoT) devices, PoS systems, and Enterprise Resource Planning (ERP) systems of the retail store environment, for extracting and interpreting one or more user activities spanning over a predefined interval. The set of instructions when executed by the processor causes the processor to generate one or more continuous processes based on aggregated and integrated information, each continuous process representing a sequence of user activities in a predefined location within the retail store environment, and aggregate one or more continuous processes into a merged weighted process, to perform process model extraction, virtualized process modelling and anomalies detection. The set of instructions when executed by the processor causes the processor to compare the merged weighted process with a predfined reference process for determining one or more process variations, and monitor a current version of the merged weighted process and a previous version of the merged weighted process to detect naturally occurring one or more ripple effects, and send one or more nudging messages based on the one or more ripple effects, to the retail store environment, and transmit a nudging action corresponding to a nudging message, to one or more entities in the retail store environment, and transmit a reward if the nudging action has been successfully performed by the one or more entities.

Embodiments of the present disclosure substantially eliminate, or at least partially address the problem of designing, organising, and supervising existing ad-hoc processes through its capability to analyze human behavior to detect activities that form a repetitive process involving human (or other moving entities) physical activities. The process model may help the management team to nudge or reshape the process aiming to increase its efficiency, and to detect and define process anomalies. Moreover, it supports continuous surveillance of the process and real-time detection of such anomalies. This allows some corrective actions to be taken through an integrated action sub-system. The corrective actions may be designed using augmented reality techniques on the smart devices to help the security officers to cover the diversity of these anomalies, and to overcome the problem of the short time between defining a new anomaly and the need to be addressed by the officers. The feedback signals materialized in the form of local "nudging" messages have a transformative effect over the entire business process by incremental propagation ("ripple effect"). This effect can be immediately measured and modulated using the live virtual process generation system and the "nudging" feedback loop.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF ILLUSTRATIVE EMBODIMENTS

The following detailed description illustrates embodiments of the present disclosure and ways in which they can be implemented. Although the best mode of carrying out the present disclosure has been disclosed, those skilled in the art would recognize that other embodiments for carrying out or practicing the present disclosure are also possible.

Figure 1:
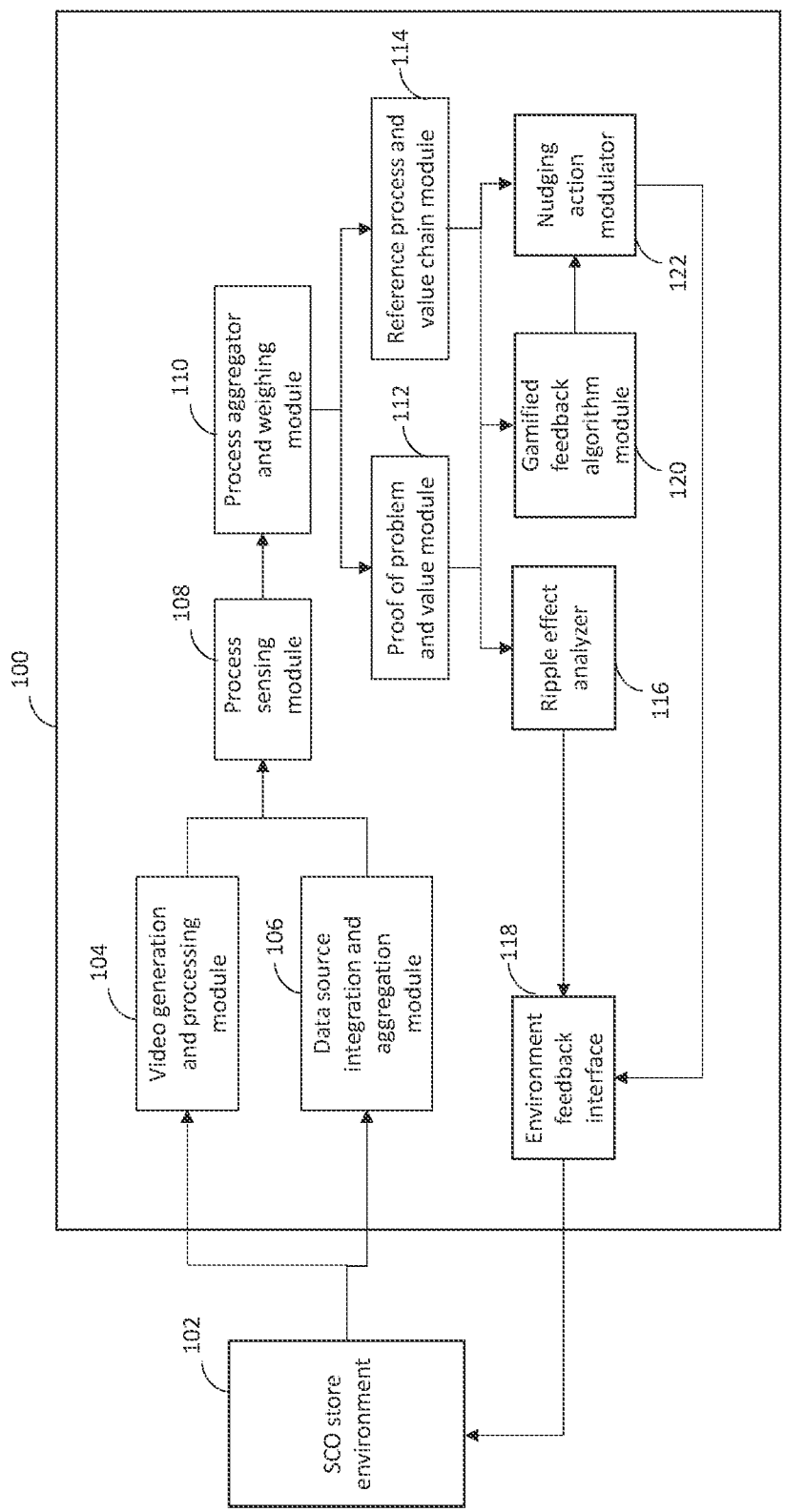
FIG. 1 illustrates a system for process shaping in a pre-defined environment, in accordance with an embodiment of the present disclosure.

FIG. 1 illustrates a system 100 for shaping one or more processes in a pre-defined environment 102, in accordance with an embodiment of the present disclosure.

In a preferred embodiment, the pre-defined environment 102 includes a self-checkout store (SCO) environment that includes entities such as employees, products, conveyors, industrial robots, and activities such as an operator entering or exiting the scene; picking, dropping, moving, weighting or scanning items; operating a touchscreen display; and paying through cash, mobile electronic transactions, or a credit card. However, it would be apparent to one of ordinary skill in the art, that the pre-defined environment 102 may include other environments such as a warehouse that includes supplier delivery, operators, conveyors, shelfs, and activities like receiving packages from suppliers, inspection, broken package rejection, sorting, dropping and picking from conveyors, storage on the shelf etc. The system 100 may also be useful in any general industrial environment involving components handling in production halls, which comprise in a large variety of ad-hoc or partially ad-hoc processes and therefore could not be understood and manually managed in a simple way.

The system 100 includes a video generation and processing component 104 that includes image capturing devices configured to capture one or more images, videos and sounds of the pre-defined environment 102 in real-time for recognizing actions of various entities such as humans, animals, and things in an image frame, and performing global tracking of such entities. Examples of the image capturing devices include, but are not limited to, Closed-Circuit Television (CCTVs) cameras, High Definition (HD)

cameras, non-HD cameras, handheld cameras, traffic cameras, police car cameras, and cameras on unmanned aerial vehicles (UAVs).

Performing global tracking includes tracking all entities such as humans, products, PoS scanning guns, bags, and shopping carts involved in a whole scene captured using a set of video capturing devices as part of the video generation and processing component 104. The global tracking denotes the ability to continuously track an entity captured by one or many cameras configured to capture video information from various parts of the pre-defined environment 102.

In an embodiment of the present disclosure, the video generation and processing component 104 includes a set of detectors and integrators for processing video and other signals and data streams to detect an equipment, an environment, one or more actions, one or more objects, or any combination thereof. The detectors include sensing equipment such as PoS barcode reader.

In another embodiment of the present disclosure, the video generation and processing component 104 may be communicatively coupled to a computer system (not shown) that provides one or more previously captured images/video streams/gif files therein. The computer system may be any computing device locally or remotely located therefrom, and that stores a plurality of videos/images in its local memory. In an embodiment, the computer system may include one or more of a computing server, a mobile device, a memory component, and a handheld device.

The system 100 further includes a data source integration and aggregation component 106 that is an interface to various other systems and equipment including and not limited to IoT devices, PoS systems, ERP solutions, and other systems, etc. The data source aggregation and integration component 106 performs the aggregation and integration of various information like video data, and PoS text information. In an embodiment of the present disclosure, the aggregation and integration component 106 synchronizes the information originated from the various systems in order to extract and interpret the activities spanning over a certain period. The data source integration and aggregation component 106 performs correlation of information associated with the same activity, that comes from various systems, and facilitates recognition of activities and matching of various parts of an observed process with predefined processes stored by ERP systems.

The system 100 further includes a process sensing component 108 that is configured to sense a continuous process as a sequence of events/actions for each channel or stream within the environment 104. A stream (or a data channel, used interchangeably) is the output of a certain sensor (e.g. a video camera). Each sensor is responsible for capturing the events occurring in a specific portion of the environment 102 as a stream of samples acquired at a specific frequency. In an example, a camera positioned on top of a PoS scanner would capture a video stream covering the area where actions such as scanning a product bar code are expected to happen.

In an embodiment of the present disclosure, the process sensing component 108 includes a set of multiple feature extractors $FE_1$ to $FE_E$. Examples of the feature extractors include, but are not limited to, image and video processing components, statistical classifiers, and deep learning (e.g. CNN) classifiers. The process sensing component 108 includes various machine learning models related to computer vision and image processing associated with detecting instances of semantic objects of a certain class (such as humans, buildings, or cars) in digital images and videos.

The system 100 further includes a process aggregator and weighing component 110 that is configured to aggregate the continuous processes of one or more channels, into a merged weighted process. The merged weighted process is the sensed process as seen by aggregating the individual processes discovered in each channel. In an example, a scanning process may be sensed using two different video cameras. The process sensing component 108 may extract a chain of weighed actions corresponding to the portion of the environment covered by each camera, where the weights represent the recognition confidence. The process aggregator and weighing component 110 may aggregate the two process representations based on a time-space correlation of each action. To merge two different actions that represent the same sequence in the scene, in case of contradictory evidence, the weights may be used for making a decision. The process aggregator and weighing component 110 is configured to perform process model extraction, virtualized process modelling and anomalies detection.

In an embodiment of the present disclosure, each video camera detects a chain of user actions, with associated weights. In an example, each video camera associates a percentage weight with corresponding user action, such as:
Video camera 1: A (x1%), B (y1%), C (z1%)
Video camera 2: A (x2%), D (y2%), C (z2%)
where A, B, C and D are user actions, In the context of the present disclosure, the merging can be performed through following steps:
1. Computing a probability of occurrence of the first user action A as an average of x1 and x2
2. Combining or choosing one of B and D as the second user action, based on a value of probability of occurrence of actions B and D. The rule for combining user actions B and D may vary, depending on how unrelated B and D are, and may be manually configured.
3. Computing a probability of occurrence of a third user action C as the average of z1 and z2

The system 100 further includes a proof of problem and value component 112, and a reference process and value chain component 114 that analyse the merged weighted process with s reference process and extracts the costs implications and proof of problem, along with archiving snapshots of the merged weighted processes.

The proof of problem and value component 112 uses the merged weighted process to determine one or more process variations or breaches, i.e. process problems. In an example, in a distribution center, the average time expected to load/unload a van is 10 minutes according to the reference process. However, due to deviations from the expected behavior of the human operator or the system in place to manage the loading/unloading of parcels, the average time increases to 15 minutes. This has a ripple effect over the entire process leading to overall effect on throughput and value.

The reference process represents the process developed and implemented as standard by the business which is designed to achieve a specific level of performance and consequently value to the business. The reference process and value chain component 114 implements dedicated Key Performance Indicators (KPIs) for the standard process allowing for evaluating the overall value of the process but also the contribution or impact of process links to the entire value of the process. In an example, in a distribution center where parcels are received, processed and then distributed, one process link could be the loading and unloading of parcels from courier vans. This step in the process includes both costs and opportunities for overall process improvement and consequently add value to the entire process. For example, the time spent by a van in the distribution center, loading and unloading parcels has an impact on the overall capacity of the distribution center and consequently parcel throughput. The system 100 further includes a ripple effect analyser 116 that is configured to monitor a current version of the merged weighted process and a previous version of the merged weighted process to detect naturally occurring one or more ripple effects, and send one or more nudging messages based on the one or more ripple effects, to the retail store environment 102. In the context of the present disclosure, the ripple effect is a notion that a single action has an effect over several different entities.

In an embodiment of the present disclosure, the ripple effect analyser 116 corelates the process stages and their interdependency to determine the effect of a change in a stage over the entire process. A nudging message is a timer or reminder generated by the ripple effect analysesr 116 to mitigate the ripple effect. In an example, in the distribution center where parcels are received, processed and then distributed, the van loading and unloading time has a ripple effect on the timing of the other process stages such as sorting of parcels per regions or addresses. To mitigate the ripple effect, the ripple effect analyser 116 may send a nudging message to a computing device of the van driver. The nudging message may include a timer or reminder regarding the time left to load/unload the van, and clear the bay.

The system 100 further includes a gamified feedback algorithm component 120 that is configured to determine optimal types of actions required to adjust and optimize the merged weighted process based on nudging messages. The gamified feedback algorithm component 120 uses the principle of action and reward to identify the most effective change that may be made to the merged weighted process. The actions to be performed based on the nudging messages are hereinafter referred to as nudging actions, and may be communicated back to the retail store environment 102 through a nudging action modulator 122. The nudging action modulator 122 may act as a filter to the nudging actions. For example, if the number of nudging message has reached a certain threshold, subsequent nudging message could be filtered.

In the context of parcel distribution, the gamified feedback alogorithm component 120 may communicate a nudging message to the driver to perform corresponding action within the indicated time. If the nudging action is performed successfully, the gamified feedback algorithm component 120 may provide bonus points to the driver, which could then be converted into a form of a benefit (money, days off, etc.).

In various embodiments of the present disclosure, the system 100 is configured to facilitate process discovery by using video feeds from the environment, perform process shaping by involving game theory and nudge theory in the application of feedback messages, and multi-player process mining incorporating deep neural networks and machine learning (expert systems). The system 100 is configured to leverage machine vision, AI and neural networks to generate and display real time insights that shape processes, remove friction and accelerate growth. Game theory in this context creates models of human behaviour based on nudges performed. Nudge theory in this context is a concept for understanding of how people think, make decisions, and behave. Every new nudge creates a new version of the process, and this needs to be observed and captured.

Throughout the present disclosure, the system 100 relates to a structure and/or component that includes programmable and/or non-programmable components configured to store, process and/or share information. Optionally, the system 100 includes any arrangement of physical or virtual computational entities capable of enhancing information to perform various computational tasks. In an example, the system 100 may include components such as a memory, a processor, a network adapter and the like, to store, process and/or share information with other computing components.

FIG. 1 is merely an example. One of ordinary skill in the art would recognize many variations, alternatives, and modifications of embodiments herein.

Figure 2:
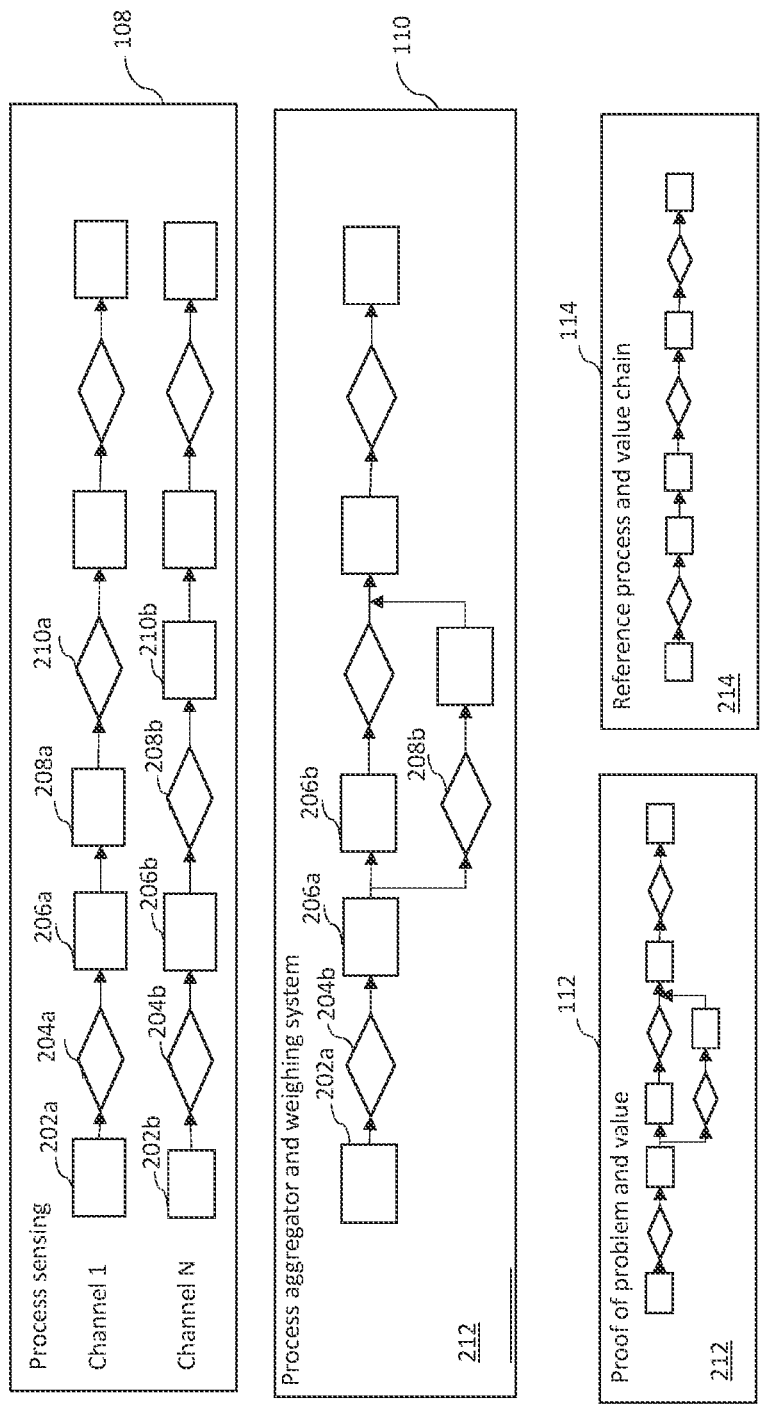
FIG. 2 illustrates in detail the components of the system of FIG. 1, in accordance with an embodiment of the present disclosure.

FIG. 2 illustrates in detail the components of the process sensing component 108, the process aggregator and weighting component 110, the proof of problem and value component 112, and the reference process and value chain component 114, in accordance with an embodiment of the present disclosure.

The process sensing component 108 is configured to sense a continuous process for each channel within the retail store environment 104 based on corresponding series of actions. In an example, the process sensing component sense a first continuous process for Channel 1 based on the series of first action 202a, second action 204a, third action 206a, fourth action 208a, fifth action 210a, and so on. Similarly, the process sensing component sense a nth continuous process for Channel N based on the series of first action 202b, second action 204b, third action 206b, fourth action 208b, fifth action 210b, and so on. Each channel represents a video camera stream of a specific portion of the retail store environment 102.

A camera positioned on top of a PoS scanner would represent Channel 1 and the process sensing component 108 may sense a scanning process based on a series of actions such as picking up the product, examining the product, moving product over scanner, and putting product in a shopping bag.

The process aggregator and weighting component 110 is configured to aggregate the individual processes discovered in each channel/stream to generate a merged weighted process 212. In entirety, the process aggregator and weighing component 110 makes use of machine learning approaches to link user actions of individual processes together, and to determine possible models of the process. In an example, the merged weighted process 212 may include user actions 202a, 204b, 206a, 206b, and 208b.

The proof of problem and value component 112 illustrates analysis of the merged weighted process 212 sensed by the process aggregator and weighing component 110 to determine process variations or breaches, i.e. process problems. The reference process and value chain component 114 illustrates a process flow 214 that depicts a reference process for evaluating the overall value of the merged weighted process but also the contribution or impact of process links to the entire value of the merged weighted process.

FIG. 2 is merely an example. One of ordinary skill in the art would recognize many variations, alternatives, and modifications of embodiments herein.

Figure 3:
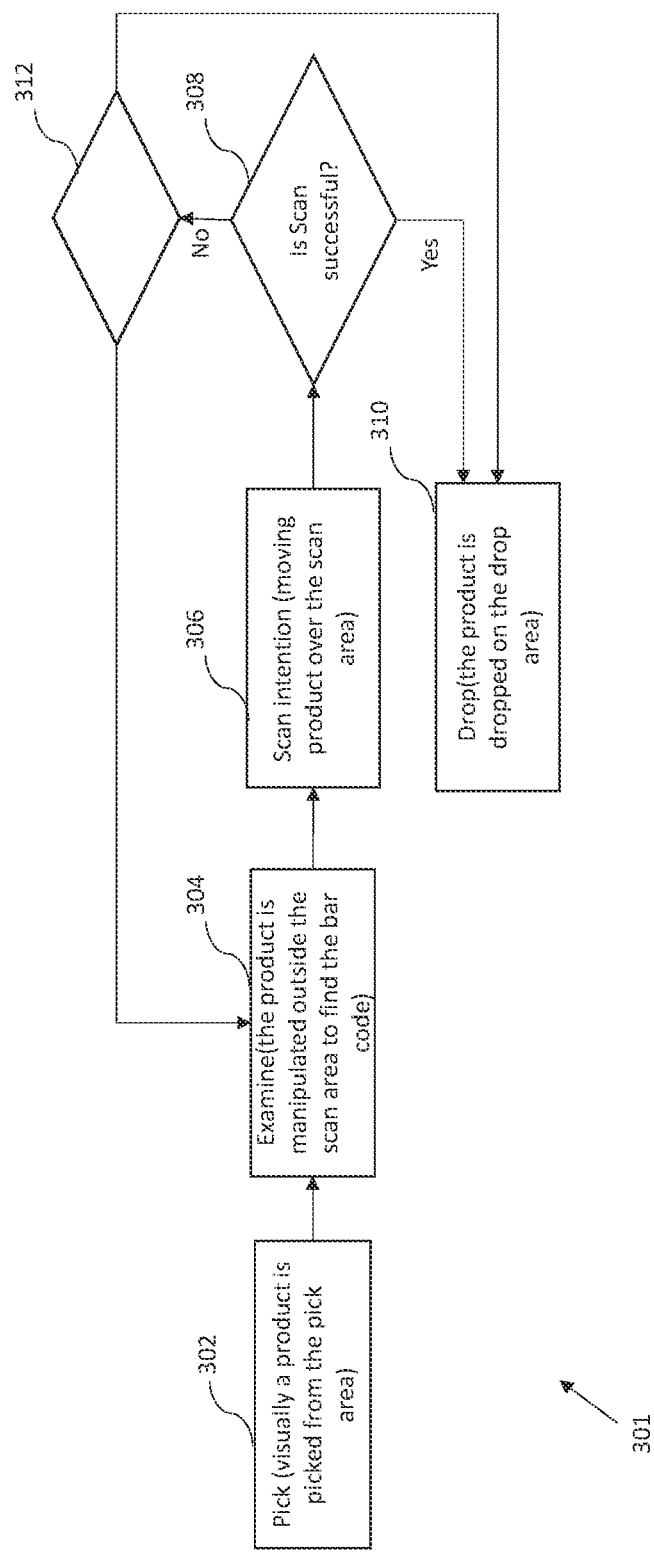
FIG. 3 illustrates an exemplary process flow/model of an extracted scanning process.

FIG. 3 illustrates an exemplary process flow/model of a scanning process 301, which is an example of the merged weighted process 202 depicted in FIG. 2), in accordance with an embodiment of the present disclosure. The scanning process 301 includes a series of user actions and checks that are performed to complete the scanning of an item in a self-check out store environment 102. The user actions are represented by rectangular boxes, whereas the checks are represented by the decision boxes. Then scanning process 301 includes a first user action 'pick' 302 in which the user physically picks a product from its original location, such as pick area. The scanning process 301 further includes a second user action 'Examine' 304 in which the user manipulates the product outside a scan area to find the bar code. The user may also perform the action 'Examine' 304 to read a price of the product. The scanning process 301 further includes a third user action 'Scan intention' 306, in which the user moves a selected product over a scan area for the purpose of scanning and billing. The scanning process 301 includes a first check 'Is Scan successful' 308 to determine if the scan action performed by the user was successful. If the scan action is successful, a fourth user action 310 is performed in which the user drops the scanned product in a drop area. The drop area may be a location, in which the products may be dropped after scanning for final collection by the user. If the scan action is unsuccessful, then it means that a non-scan event has occurred, and the process flow goes to a right unconditioned branch of decision box 312, which is represented as an empty diamond. The non-scan event is a well-known retail scan process anomaly.

FIG. 3 is merely an example. One of ordinary skill in the art would recognize many variations, alternatives, and modifications of embodiments herein.

Figure 4:
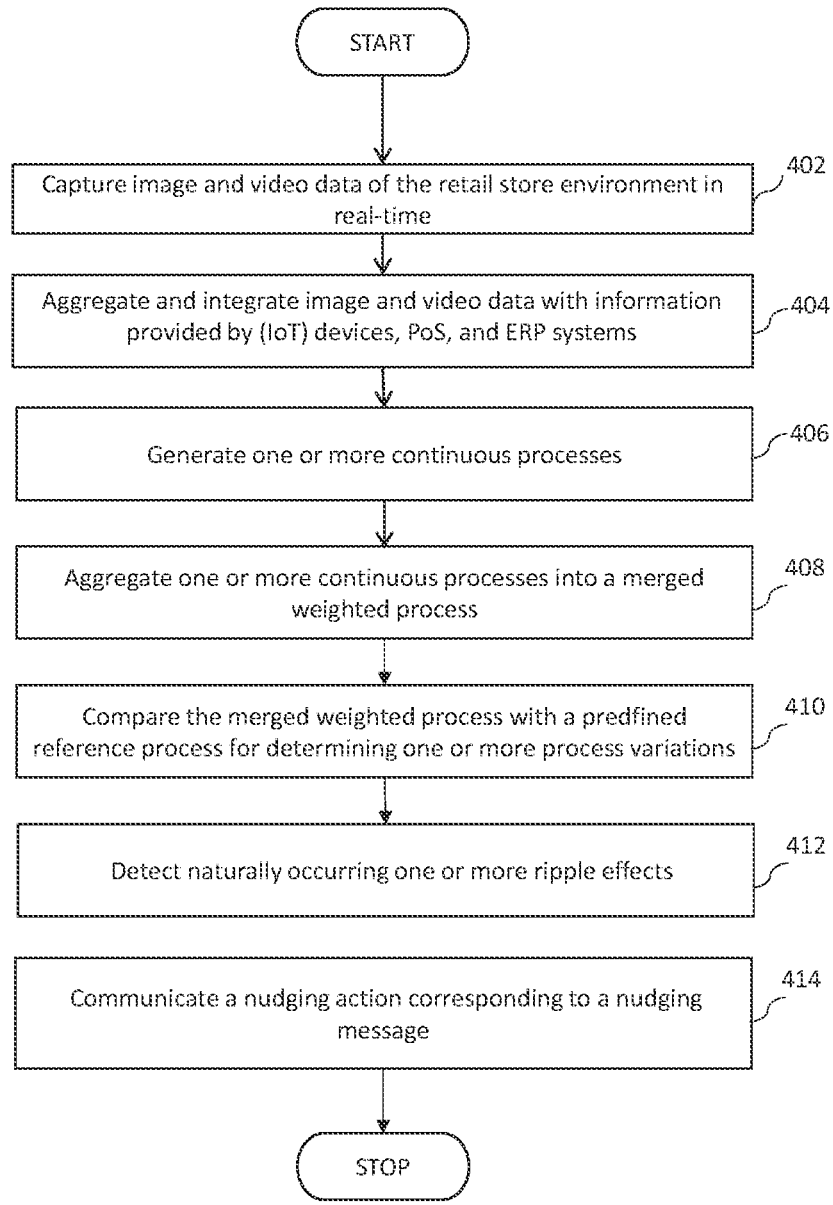
FIG. 4 is an illustration of steps of a method of shaping processes, in accordance with the present disclosure.

FIG. 4 is an illustration of steps of a method for shaping processes, in accordance with the present disclosure. The method is depicted as a collection of steps in a logical flow diagram, which represents a sequence of steps that can be implemented in hardware, software, or a combination thereof.

At a step 402, image and video data of the retail store environment is captured in real-time by image capturing devices of a video generation and processing component, for recognizing one or more actions of one or more entities, and performing global tracking of the one or more entities. Performing global tracking includes tracking all entities such as humans, products, PoS scanning guns, bags, and shopping carts involved in a whole scene. The global tracking denotes the ability to continuously track an entity captured by one or many cameras configured to capture video information from various parts of the pre-defined environment.

The video generation and processing component further includes a set of detectors and integrators for processing image and video data to detect one or more equipment, one or more actions, one or more objects, and one or more users in the retail store environment. The detectors include sensing equipment such as PoS barcode reader.

At a step 404, image and video data are integrated with information provided by Internet of Things (IoT) devices, PoS systems, and Enterprise Resource Planning (ERP) systems of the retail store environment, for extracting and interpreting one or more user activities spanning over a predefined interval. In an embodiment of the present disclosure, there is performed correlation of information associated with the same activity, that comes from various systems, and recognition of activities and matching of various parts of an observed process with predefined processes stored by ERP systems.

At a step 406, one or more continuous processes are generated based on aggregated and integrated information, each continuous process representing a sequence of user activities in a predefined location within the retail store environment. In an embodiment of the present disclosure, a continuous process may be sensed as a sequence of events/actions for each channel or stream within the environment. A stream (or a data channel, used interchangeably) is the output of a certain sensor (e.g. a video camera). Each sensor is responsible for capturing the events occurring in a specific portion of the environment as a stream of samples acquired at a specific frequency. In an example, a camera positioned on top of a PoS scanner would capture a video stream covering the area where actions such as scanning a product bar code are expected to happen.

At a step 408, one or more continuous processes are aggregated into a merged weighted process, to perform process model extraction, virtualized process modelling and anomalies detection. In an embodiment of the present disclosure, two continuous processes are aggregated based on a time-space correlation of corresponding actions. The merged weighted process is the sensed process as seen by aggregating the individual processes discovered in each channel. In an example, a scanning process may be sensed using two different video cameras, and a chain of weighed actions corresponding to the portion of the environment covered by each camera may be extracted, where the weights represent the recognition confidence.

At a step 410, the merged weighted process is compared with a predfined reference process for determining one or more process variations. The reference process represents a process developed and implemented as standard by corresponding business and is designed to achieve a predefined level of performance and value to the business. In an example, in a distribution center, the average time expected to load/unload a van is 10 minutes according to the reference process. However, due to deviations from the expected behavior of the human operator or the system in place to manage the loading/unloading of parcels, the average time increases to 15 minutes.

At a step 412, a current version of the merged weighted process and a previous version of the merged weighted process is monitored to detect naturally occurring one or more ripple effects, and send one or more nudging messages based on the one or more ripple effects, to the retail store environment. In the context of the present disclosure, the ripple effect is a notion that a single action has an effect over several different entities. A nudging message is a timer or reminder generated by the ripple effect analysesr to mitigate the ripple effect. In an example, in the distribution center where parcels are received, processed and then distributed, the van loading and unloading time has a ripple effect on the timing of the other process stages such as sorting of parcels per regions or addresses. To mitigate the ripple effect, a nudging message may be transmitted to a computing device of the van driver. The nudging message may include a timer or reminder regarding the time left to load/unload the van, and clear the bay.

At step 414, a nudging action is communicated corresponding to a nudging message, to one or more entities in the retail store environment. The actions to be performed based on the nudging messages are hereinafter referred to as nudging actions, and may be communicated back to the retail store environment through a nudging action modulator. The nudging action modulator may act as a filter to the nudging actions. For example, if the number of nudging message has reached a certain threshold, subsequent nudging message could be filtered.

Further, a reward may be issued if the nudging action has been successfully performed by the one or more entities. In an embodiment of the present disclosure, the principle of action and reward is used to identify the most effective change that may be made to the merged weighted process. In the context of parcel distribution, a nudging message may be communicated to the driver to perform corresponding action within the indicated time. If the nudging action is performed successfully, bonus points may be provided to the driver, which could then be converted into a form of a benefit (money, days off, etc.).

FIG. 4 is merely an example. A person skilled in the art will recognize many variations, alternatives, and modifications of embodiments of the present disclosure.

Figure 5:
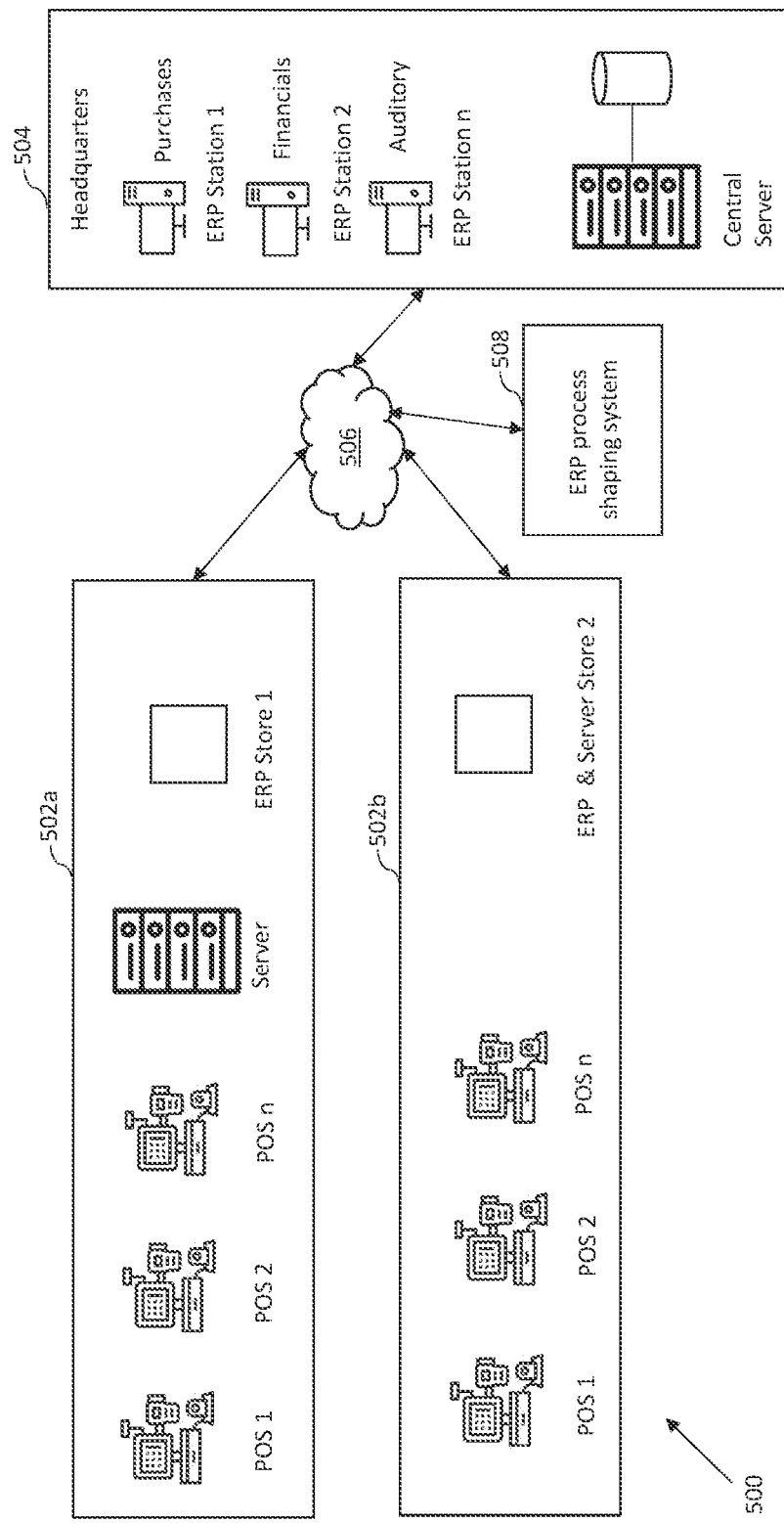
FIG. 5 illustrates an exemplary retail store environment, in accordance with the present disclosure.

FIG. 5 illustrates an exemplary environment 500, in accordance with an embodiment of the present disclosure. In this example, environment 500 may be a retail environment.

For example, the environment 500 may include first and second retail stores 502a and 502b, each communicatively coupled to each other and to a headquarters 504 through a communication network 506. The communication network 506 may be any suitable wired network, wireless network, a combination of these or any other conventional network, without limiting the scope of the present disclosure. Few examples may include a Local Area Network (LAN), wireless LAN connection, an Internet connection, a point-to-point connection, or other network connection and combinations thereof.

During operational hours, each of the first and second retail stores 502a and 502b may include a number of entities such as customers, operators, products on display, shopping carts, scanning guns, and PoS terminals. A PoS terminal is an electronic device used to process sales and payments at retail locations. The PoS terminals allow to easily keep track of sales, orders, and purchases, thus eliminating the hassle and admin associated with old legacy systems or manual pen and paper solutions. The PoS terminals of a retail store may be communicatively coupled to each other through a communication network, and controlled by a local Enterprise Resource Planning (ERP) system and an associated local server. The first retail store 502a includes three PoS terminals, a server, and a first ERP store, whereas the second retail store 502b include three PoS terminals, and an ERP and server store.

Both the first and second retail stores 502a and 502b may be remotely controlled by the headquarters 504 that includes one or more ERP stations and a central server communicatively coupled to the ERP stations, for handling purchases, financials and auditory functions of the first and second retail stores 502a and 502b.

The environment 500 further includes an ERP process shaping system 508 that is an example of the system 100 of FIG. 1. The ERP process shaping system 508 provides a methodology and an apparatus for shaping one or more ERP systems of the environment 500 by extracting a model of a partially constrained ad-hoc process involving unpredictable human behaviour of some untrained actors playing various roles in the process using sensors surveillance and artificial intelligence, and detect in real-time, some process anomalies. The ERP process shaping system 508 provides an efficient component based on augmented reality meant to help people involved in the process surveillance to understand some new type of anomalies, and to support them to take the most appropriate corrective action.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A retail environment comprising:
one or more entities configured to perform one or more activities corresponding to a respective process of one or more processes; and
a system comprising a memory and a processor for shaping the one or more processes in the one or more entities configured to perform the one or more activities, the processor configured to:
capture image and video data of the retail environment in real-time for recognizing actions of the one or more entities and performing global tracking of the one or more entities;
aggregate and integrate the captured image and video data and Internet of Things (IoT) devices, Point of Sale (PoS) systems, and Enterprise Resource Planning (ERP) systems of the retail environment, for extracting and interpreting one or more user activities spanning over a predefined interval;
generate one or more continuous processes based on aggregated and integrated information, each continuous process representing a sequence of user activities in a predefined location within the retail environment;
aggregate one or more continuous processes into a merged weighted process, to perform process model extraction, virtualized process modelling and anomalies detection;
compare the merged weighted process with a predefined reference process to determine one or more process variations;
monitor a current version of the merged weighted process and a previous version of the merged weighted process to detect naturally occurring one or more ripple effects, and send one or more nudging messages based on the one or more ripple effects, to the retail environment; and
transmit a nudging message that communicates a nudging action, to one or more entities in the retail environment, and transmit a reward if the nudging action has been successfully performed by the one or more entities.

2. The retail environment of claim 1, wherein the system further includes a set of detectors and integrators for processing image and video data to detect one or more equipment, one or more actions, one or more objects, and one or more users in the retail environment.

3. The retail environment of claim 1, wherein the processor includes a set of feature extractors for detecting instances of semantic objects of one or more classes in video and image data.

4. The retail environment of claim 1, wherein the processor is configured to aggregate two continuous processes based on a time-space correlation of corresponding actions.

5. The retail environment of claim 1, wherein the processor is further configured to determine the reference process, wherein the reference process is developed and implemented as standard by a business to achieve a predefined level of performance and value to the business.

6. The retail environment of claim 1, wherein the processor is further configured to filter one or more nudging actions, if a number of nudging messages has reached a predefined nudge threshold.

7. A method for operating a retail environment, the method comprising:

shaping one or more processes, wherein one or more entities perform one or more activities;

capturing image and video data of the retail environment in real-time for recognizing one or more actions of the one or more entities and performing global tracking of the one or more entities;

aggregating and integrating image and video data with information provided by Internet of Things (IoT) devices, Point of Sale (PoS) systems, and Enterprise Resource Planning (ERP) systems of the retail environment for extracting and interpreting one or more user activities spanning over a predefined interval;

generating one or more continuous processes based on aggregated and integrated information, each continuous process representing a sequence of user activities in a predefined location within the retail environment;

aggregating one or more continuous processes into a merged weighted process to perform process model extraction, virtualized process modelling and anomalies detection;

comparing the merged weighted process with a predefined reference process for determining one or more process variations;

monitoring a current version of the merged weighted process and a previous version of the merged weighted process to detect naturally occurring one or more ripple effects, and sending one or more nudging messages based on the one or more ripple effects to the retail environment; and transmitting a nudging message that communicates a nudging action to one or more entities in the retail environment; and transmitting a reward if the nudging action has been successfully performed by the one or more entities.

8. The method of claim 7, further comprising processing image and video data to detect one or more equipment, one or more actions, one or more objects, and one or more users in the retail environment.

9. The method of claim 7, further comprising detecting instances of semantic objects of one or more classes in video and image data.

10. The method of claim 7, further comprising aggregating two continuous processes based on a time-space correlation of corresponding actions.

11. The method of claim 7, wherein the predefined reference process represents a process developed and implemented as standard by a business to achieve a predefined level of performance and value to the business.

12. The method of claim 7, further comprising filtering one or more nudging actions if a number of nudging messages has reached a predefined nudge threshold.

13. A non-transitory computer-readable medium for a process shaping system in a retail environment, the non-transitory computer-readable medium comprising a set of instructions, the set of instructions when executed by a processor causes the process shaping system to:

capture image and video data of the retail environment in real-time, for recognizing one or more actions of one or more entities, and performing global tracking of the one or more entities;

aggregate and integrate image and video data with information provided by Internet of Things (IoT) devices, Point of Sale (PoS) systems, and Enterprise Resource Planning (ERP) systems of the retail environment, for extracting and interpreting one or more user activities spanning over a predefined interval;

generate one or more continuous processes based on aggregated and integrated information, each continuous process representing a sequence of user activities in a predefined location within the retail environment;

aggregate one or more continuous processes into a merged weighted process, to perform process model extraction, virtualized process modelling and anomalies detection;

compare the merged weighted process with a predefined reference process for determining one or more process variations;

monitor a current version of the merged weighted process and a previous version of the merged weighted process to detect naturally occurring one or more ripple effects, and send one or more nudging messages based on the one or more ripple effects, to the retail environment; and transmit a nudging message that communicates a nudging action, to one or more entities in the retail environment, and transmit a reward if the nudging action has been successfully performed by the one or more entities.

14. The non-transitory computer-readable medium of claim 13, wherein the set of instructions when executed by the processor further causes the process shaping system to process image and video data to detect one or more equipment, one or more actions, one or more objects and one or more users in the retail environment.

15. The non-transitory computer-readable medium of claim 13, wherein the set of instructions when executed by the processor further causes the process shaping system to detect instances of semantic objects of one or more classes in video and image data.

16. The non-transitory computer-readable medium of claim 13, wherein the set of instructions when executed by the processor further causes the process shaping system to aggregate two continuous processes based on a time-space correlation of corresponding actions.

17. The non-transitory computer-readable medium of claim 13, wherein the predefined reference process represents a process developed and implemented as standard by a business to achieve a predefined level of performance and value to the business.

18. The non-transitory computer-readable medium of claim 13, wherein the set of instructions when executed by the processor further causes the process shaping system to filter one or more nudging actions, if a number of nudging messages has reached a predefined nudge threshold.

* * * * *